(No Model.) 2 Sheets—Sheet 1.

J. A. NORTON.
CORN HARVESTING MACHINE.

No. 411,728. Patented Sept. 24, 1889.

WITNESSES
John Endure Jr.
H. E. Peck

INVENTOR
Jas. A. Norton,
per O. E. Duff,
Attorney (No Model.) 2 Sheets—Sheet 2.
J. A. NORTON.
CORN HARVESTING MACHINE.
No. 411,728. Patented Sept. 24, 1889.
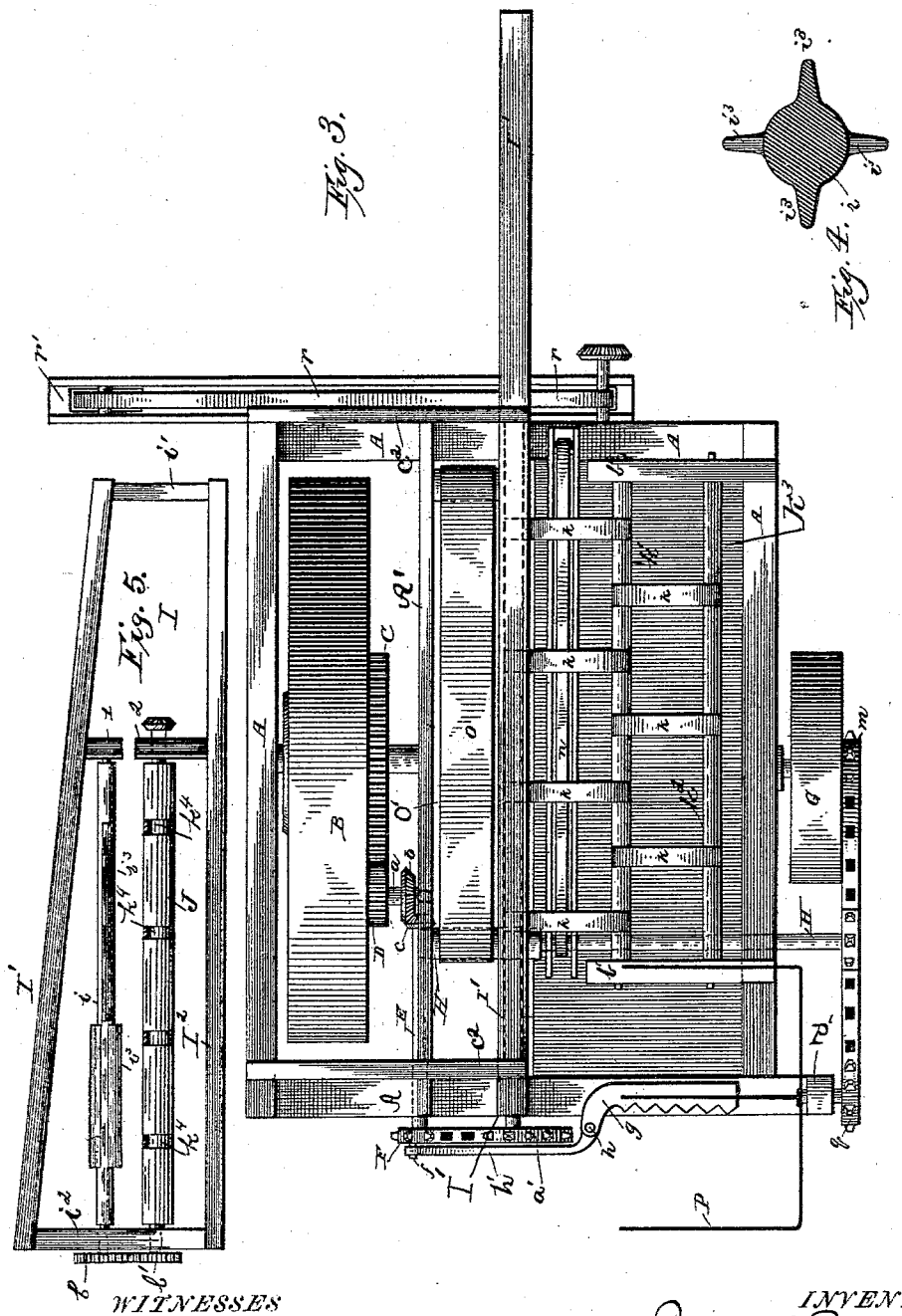
WITNESSES
John Enders Jr.
H. E. Peck.
INVENTOR
Jas. A. Norton.
per O. E. Duffy
Attorney

UNITED STATES PATENT OFFICE.

JAMES A. NORTON, OF VAIL, IOWA, ASSIGNOR OF ONE-HALF TO JOHN A. STONE, OF SAME PLACE, AND HUGH LANGAN, OF CENTREVILLE, DAKOTA TERRITORY.

CORN-HARVESTING MACHINE.

SPECIFICATION forming part of Letters Patent No. 411,728, dated September 24, 1889.

Application filed May 5, 1885. Serial No. 164,427. (No model.)

*To all whom it may concern:*

Be it known that I, JAMES A. NORTON, of Vail, in the county of Crawford and State of Iowa, have invented certain new and useful Improvements in Corn-Harvesting Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to certain improvements in corn-harvesters.

The object of the invention is to provide an improved machine of the above class which will cut the stalks so that they will fall parallel to the line of draft and can be conveyed across the machine transversely to the line of draft to a pair of husking-rollers carried by a peculiar frame to prevent clogging or choking of the rollers; also, to provide separate means for conveying the ears and stalks. These objects are accomplished by and my invention consists in certain novel features of construction and combinations of parts more fully described hereinafter, and particularly pointed out in the claims.

Figure 1:
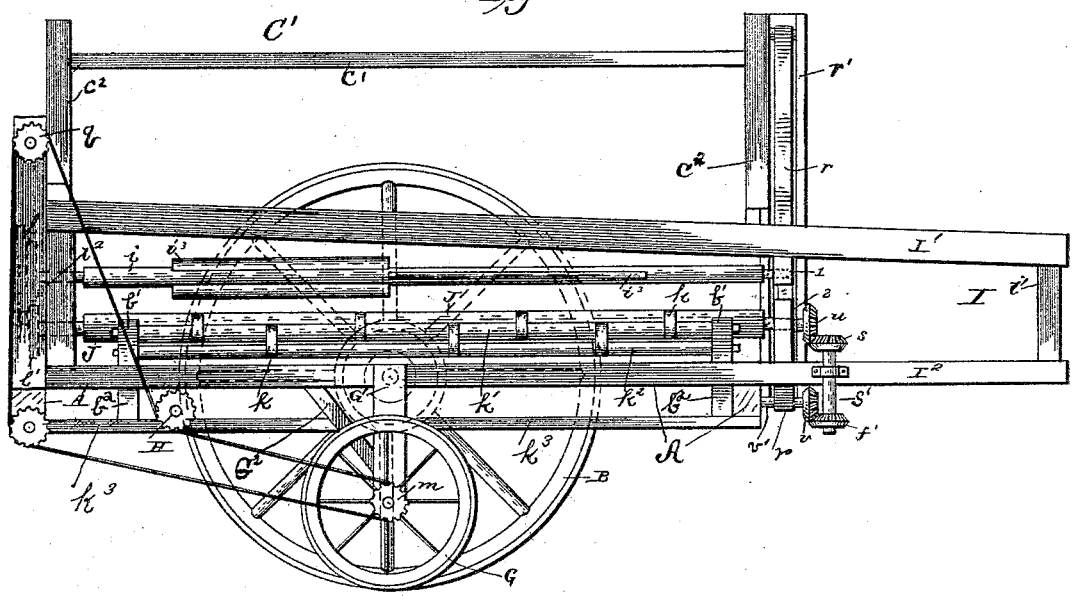
Figure 2:
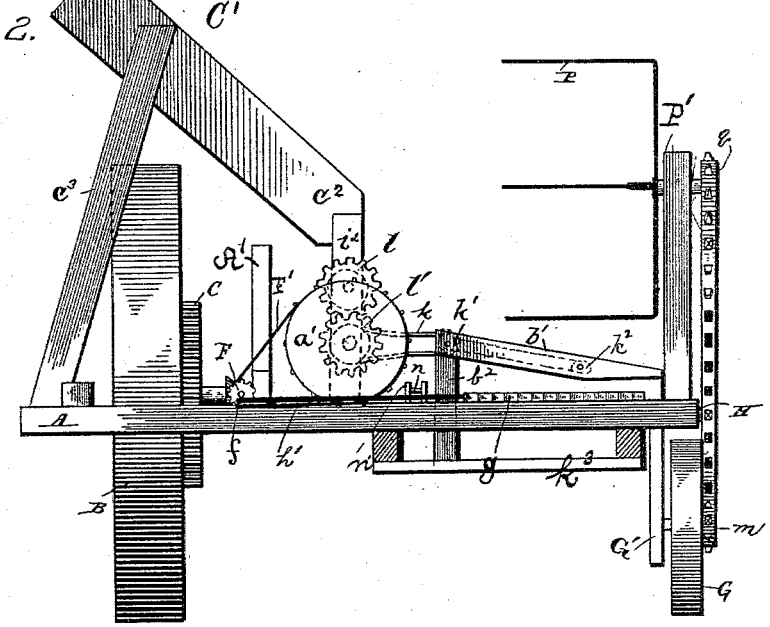

Referring to the accompanying drawings, Figure 1 is a side elevation of the machine, looking toward the right-hand side of the same, as shown in Fig. 2. Fig. 2 is a front elevation of the machine, the elevator-trough not being shown, to prevent confusion of parts. Fig. 3 is a top plan, dotted lines showing the ribbed husking-roller, the cross-bar of the elevator-frame being removed. Fig. 4 is a cross-section of the ribbed husking-roller. Fig. 5 is a detail elevation of the yoke or frame in which the husking-rollers are mounted.

In the drawings, the reference-letter A indicates the main rectangular supporting-frame of the machine, consisting of side beams and end sills.

The main driving and supporting wheel B is provided with a gear C, meshing with and driving a pinion D, mounted on a short shaft $a$, also provided with a beveled gear $b$, which beveled gear $b$ transmits motion to the cutting apparatus through the medium of a shaft E, journaled in the frame and provided with a bevel-gear $c$, on one end meshing with gear $b$ and on its opposite end with a sprocket-wheel F, having a crank-pin $f$ projecting from its face and connected with the sickle or cutter-bar $g$ of the cutting apparatus by a pitman $h'$ and knuckle-joint $h$, the cutting apparatus being preferably located in the front left-hand corner of the machine.

An upright yoke or elongated frame I is longitudinally located along the central portion of the machine and extends a distance beyond the rear end of the same, as shown in Figs. 1 and 3, and consists of the longitudinal bars $I'$ $I^2$, secured together at their ends by the vertical end bars $i'$ $i^2$. The lower bar $I^2$ is immediately secured upon the frame, while the bar $I'$ is supported a distance above the beam $I^2$ by the end bars $i'$ $i^2$. A cylindrical husking-roller J is mounted in the yoke, immediately above the lower bar $I^2$ thereof, and at its rear end the roller is journaled in a post 2, secured to and extending up from the beam $I^2$, and its front end is journaled in the end bar $i^2$, and the journal is extended through said bar, and provided upon its outer end with a sprocket-wheel $a'$, driven by the wheel F through the medium of a sprocket-chain F'. Another husking-roller $i$ is located in the yoke parallel with and a distance above the cylindrical roller J, and is provided upon its outer periphery with radial ribs $i^3$. These ribs are preferably four in number and arranged in pairs, the ribs of one pair being located on diametrically-opposite sides of the roller and extending a portion of the length of the same, the other pair of ribs extending from the ends of the first-mentioned ribs toward the opposite end of the roller and are oppositely located to each other and in a plane at right angles to the plane of the first-mentioned pair.

The roller $i$ is journaled at its rear end in an arm 1, secured to and projecting down from the bar $I'$ above the post 2, but of such length as to leave a space between them, as clearly shown in Figs. 1 and 5, and the other end of the roller is journaled in the end bar $i^2$ and extends through the same, and is provided with a gear $l$, meshing with a gear $l'$ on the journal of roller J, as clearly shown in Fig. 2, the gear $l'$ being mounted upon the shaft of the roller J, between sprocket-wheel $a'$ and end post $i^2$. It will thus be seen that the husking-rollers are actuated by the gear C to rotate in opposite directions through the medium of the gearing before described.

A supplemental driving-wheel G is mounted upon a short arm G', depending from the side of the main frame opposite that upon which the main wheel B is located, and is braced by a bar $G^2$, secured to said arm G' and the main frame, and a sprocket-wheel $m$ is secured upon the hub of said wheel G.

A reel P is mounted above the cutting apparatus in a vertical post P', extending upwardly from the main frame, and the reel-shaft is provided with a sprocket-wheel $q$.

A shaft H extends transversely through and is journaled in the front portion of the main frame, extending below and on each side of the husking-rollers. This shaft carries and actuates the ear-conveying apron $n$, operating in a trough $n'$, extending in a plane beneath and parallel with the right-hand side of the husking-rollers. The opposite end of the apron is supported by a roller in the other end of the trough. This ear-conveying apron discharges into the lower end of a similar trough $r'$, sufficiently elevated at its outer end to drop the ears into a wagon or other vehicle, and a carrying-belt $r$ travels in the trough and is actuated by the bevel-gear $u$, mounted on the end of the shaft of husking-roller J, and meshing with bevel-gear $s$ on one end of a short vertical shaft $s'$, journaled on beam $I^2$, and at its lower end provided with a bevel-gear $f'$, meshing with a bevel-gear $v$ on the end of the short horizontal shaft $v'$, driving the conveyer-belt $r$, and upon which shaft the lower end of the conveyer-belt is mounted.

A trough O', formed on one side by the upright piece A', secured to and extending between the end bars of the main frame A, and on the opposite side by the bar $I^2$ and roller J, is located in the opposite side of and parallel with the husking-rollers from the ear conveyer-trough $n'$, and contains a stalk-conveying belt O, mounted at its front end upon and driven by the shaft H, and at the opposite end of the trough the belt O is mounted upon a roller, as usual.

A pair of bars $b'$, at opposite ends of the machine, extend inwardly and upwardly toward the husking-rollers from the side beam of the main frame upon the same side as the cutting apparatus, and are supported at their inner ends by posts $b^2$, secured to platform $k^3$, and a pair of rollers $k'$ $k^2$ are journaled at their opposite ends in these bars parallel with each other and with the cylinder husking-roller, and the rollers are so located that the distance between the same is equal, or nearly so, with the distance between the roller $k'$ and roller J, and two series of belts $k$ are mounted upon and connect the rollers $k'$, $k^2$, and J, one series connecting the rollers $k'$ and $k^2$ and the other series connecting roller $k'$ and roller J. The cylinder husking-roller and the rollers $k'$ $k^2$ are preferably grooved, as shown at $k^4$, to receive the belts $k$, so that the belts will not be injured by the ears and stalks. By reason of the upward continuation of the bars $b'$ the belts $k$ slope upwardly toward the husking-rollers, and the belts $k$ and the rollers upon which they are mounted are actuated so as to constantly move upward toward the husking-rollers by the roller J.

The main frame is provided with a flooring $k^3$ beneath the belts $k$.

As the machine is moved forward along a row of standing corn the cutting apparatus, operated as described, will sever the stalks and the reel will throw the same rearwardly and in the line of draft upon the endless revolving belts $k$. These belts will convey the stalks laterally up to the husking-rollers, which are constantly revolving inwardly toward each other in opposite directions, and thereby the stalks will be drawn in between the rollers, and as the same revolve the ribs upon the upper roller will impinge upon the ears and separate them from the husks. The ears will then drop into the trough $n'$ upon the belt $n$ and be conveyed to the belt $r$, and up the same to a wagon or other vehicle, and the stalks and husks will pass between the rollers and fall into the trough containing the stalk-conveyer O, which will convey the stalks to the rear end of the machine. Stalks that are longer than the husking-rollers will readily pass between the same without bending and clogging, as the ends of the stalks when longer than the rollers or when bent are lifted by the rear end of the frame I and pass through the space between the arm I' and post 2 as the ears are being removed and husked, and in order to allow the passage between the rollers of extra large stalks, &c., without clogging or choking the upper bar I' is somewhat elastic or flexible where the arm I is secured to allow a slight upward spring, and thereby allow the rollers to separate slightly when under sufficient pressure.

The elevator-belt $r$ and its trough are supported by a frame C', which also prevents permanent "springing" of the bar I' of the yoke I, and this frame consists of bars $c^3$, secured to the outside bar of the main frame at opposite ends of the same and extending in an inclined position upwardly over the wheel B, and at their upper ends connected by a cross-bar $c'$ and provided with the inclined bars $c^2$, secured to the cross-bar $c'$ or to the upwardly-inclined bars and extending downwardly and secured to the bar I'. The form of this frame C' is such (by reason of the size of the bars $c^3$ and the inclined position of said bars and the bars $c^2$) that it allows slight upward spring of the central portion of the bar I', but prevents it from permanently bending.

Having thus fully described my invention, what I claim as new, and desire to secure by Letters Patent of the United States, is—

1. In a corn-harvesting machine, the combination, with the cutting apparatus, of the conveying-belts, the roller provided with grooves for the reception of said belts, the upper husking-roller having ribs such as described at intervals of its periphery, and the elongated frame-bars having bearings for the rear ends of said roller-shafts, said bars being arranged to yield, for the purpose set forth and described.

2. In a corn-harvesting machine, the combination of the elongated frame-bars arranged to yield near their center, with the ribbed husking-roller and a smooth husking-roller, both having bearings near the center of said yielding bars, as and for the purpose set forth.

3. In a combined corn harvesting and husking machine, the combination of the sickle, an endless-belt platform immediately in the rear of the sickle, husking-rollers arranged at right angles with the sickle and in a plane transverse to the movement of said belts, and the yielding frame carrying said husking-rollers, as set forth.

4. The combination, in a corn harvesting and husking machine, with the husking-rollers, of the yielding-frame bars provided with bearings for said rollers and having a passage between them for the stalks, whereby the rollers can yield for the passage of large stalks, as and for the purpose described.

5. The combination, in a corn-harvester, of the sickle, the belts or chains, the yielding frame-bars, husking-rollers, the aprons for conveying away the corn ears and stalks, respectively, said aprons being parallel to each other and at right angles to the cornstalk receiving and feeding belts or chains, all operating together as set forth.

In testimony that I claim the foregoing as my own I affix my signature in presence of two witnesses.

JAMES A. NORTON.

Witnesses:
O. E. DUFFY,
M. P. CALLAN.